Figure 1:
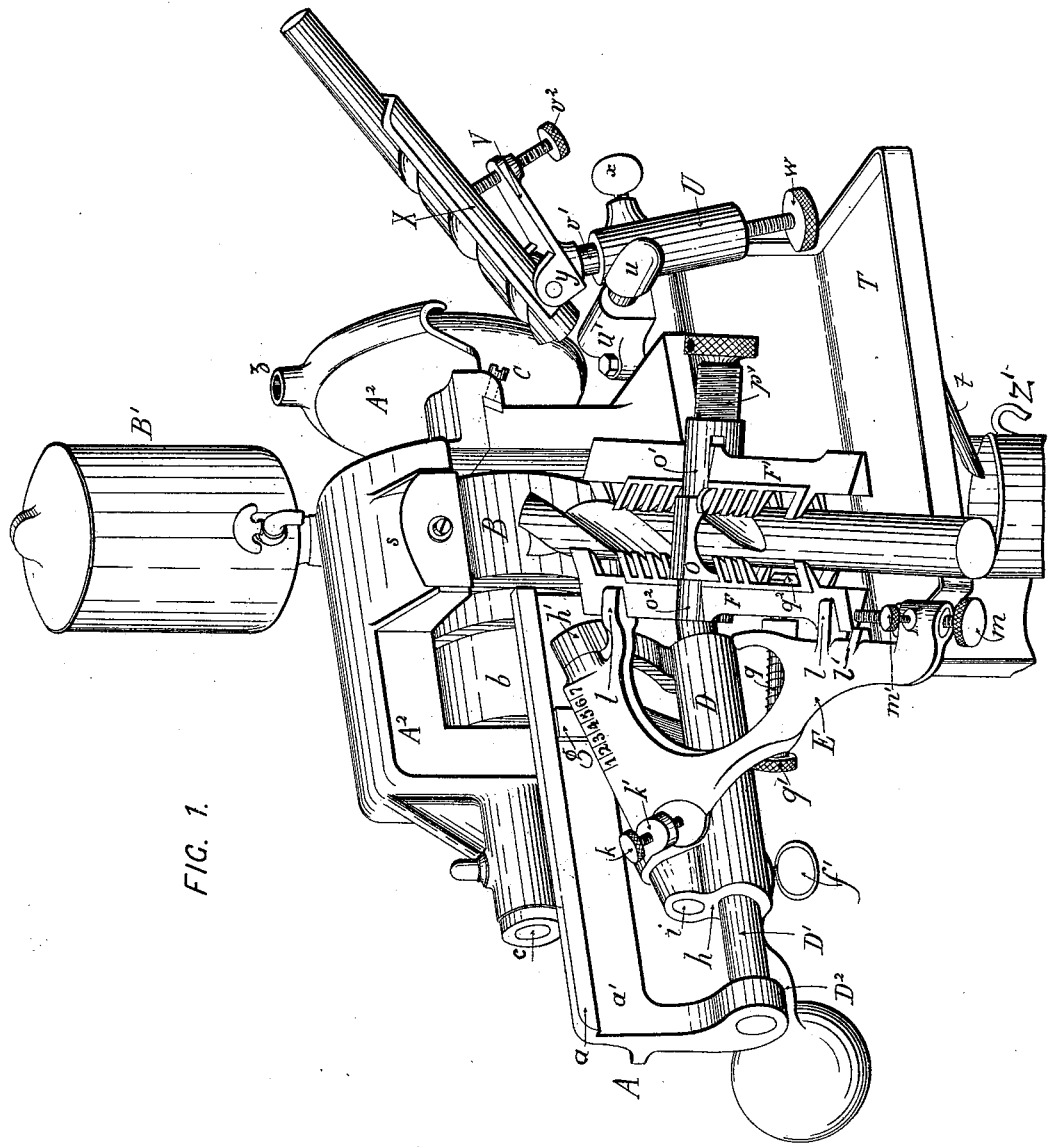

No. 622,212. Patented Apr. 4, 1899.
R. DUTTON, Dec'd.
M. C. DUTTON, Executrix.
TWIST DRILL GRINDER.
(Application filed Dec. 31, 1897.)

(No Model.) 6 Sheets—Sheet 1.

WITNESSES:

Mary C. Dutton, INVENTOR
Executrix of the last Will & Testament
of Rufus Dutton, deceased.

No. 622,212. Patented Apr. 4, 1899.
R. DUTTON, Dec'd.
M. C. DUTTON, Executrix.
TWIST DRILL GRINDER.
(Application filed Dec. 31, 1897.)
(No Model.) 6 Sheets—Sheet 2.
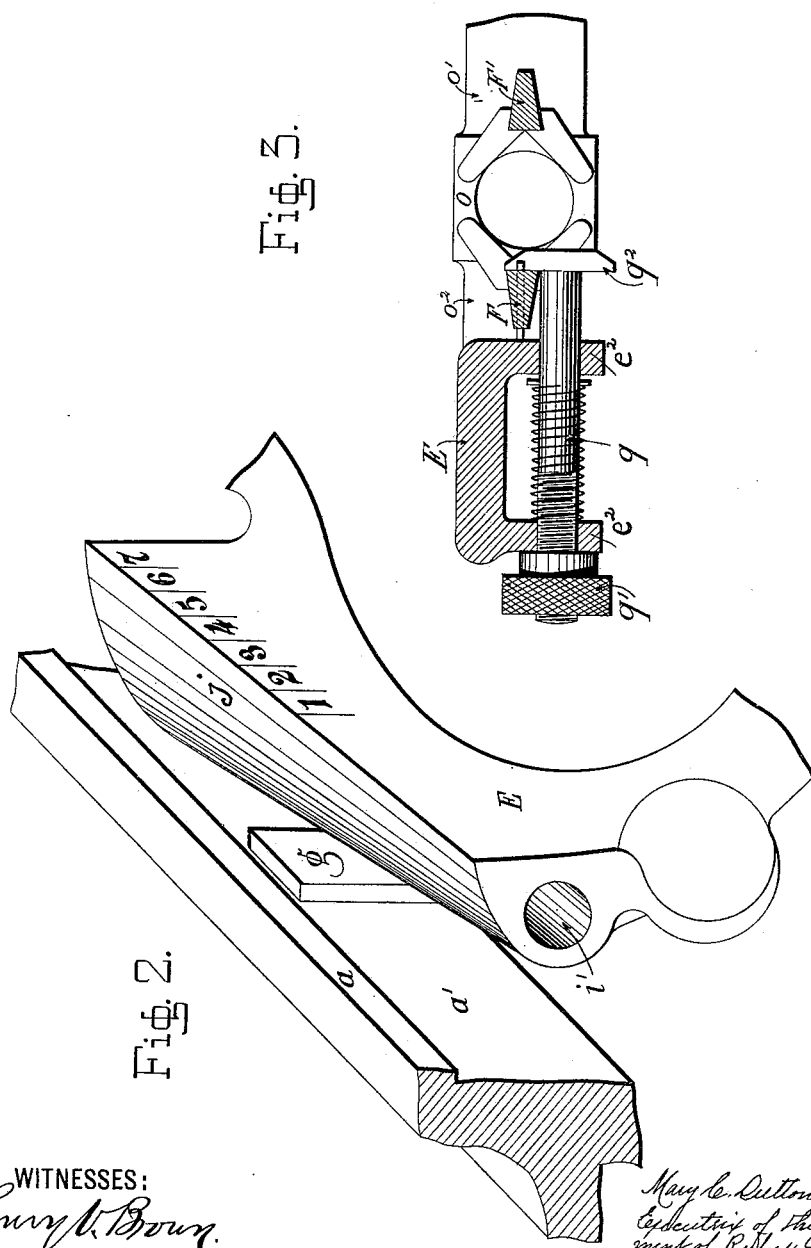

No. 622,212. Patented Apr. 4, 1899.
R. DUTTON, Dec'd.
M. C. DUTTON, Executrix.
TWIST DRILL GRINDER.
(Application filed Dec. 31, 1897.)
(No Model.) 6 Sheets—Sheet 3.
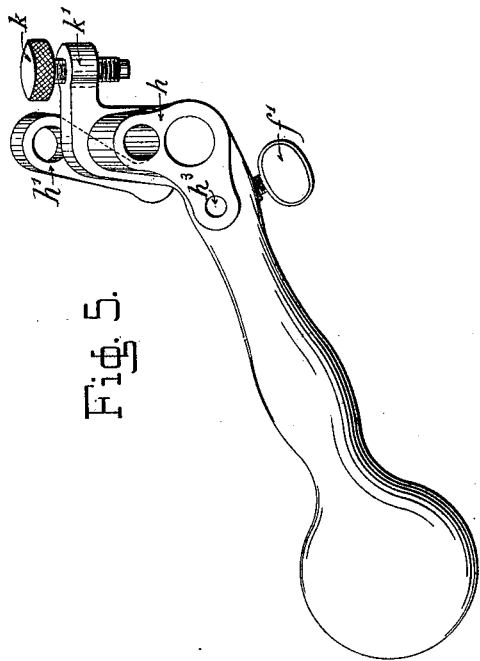
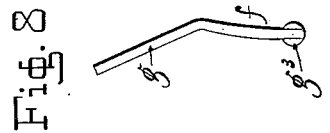
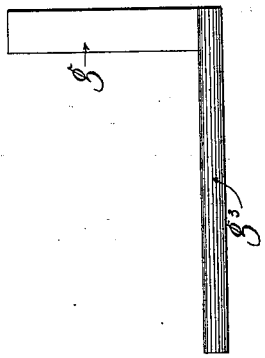
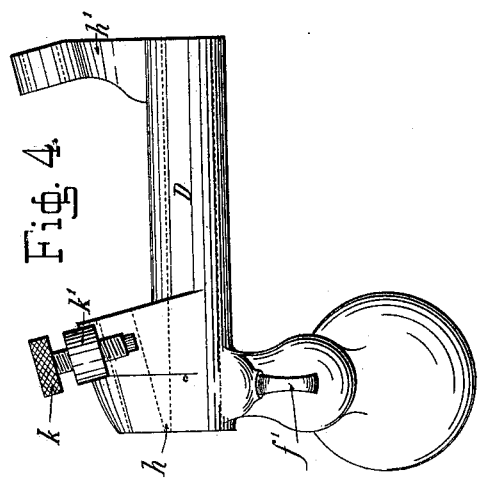
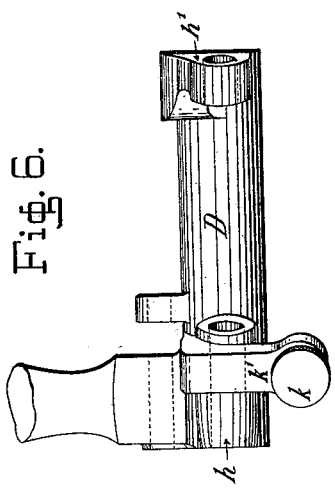
WITNESSES:
Henry V. Brown.
Bernard J. Isecke.
Mary C. Dutton, INVENTOR
Executrix of the last Will & Testament of Rufus Dutton, deceased
THE NORRIS PETERS CO., PHOTO-LITHO., WASHINGTON, D. C.

No. 622,212.
R. DUTTON, Dec'd.
M. C. DUTTON, Executrix.
TWIST DRILL GRINDER.
(Application filed Dec. 31, 1897.)
Patented Apr. 4, 1899.
(No Model.)
6 Sheets—Sheet 4.
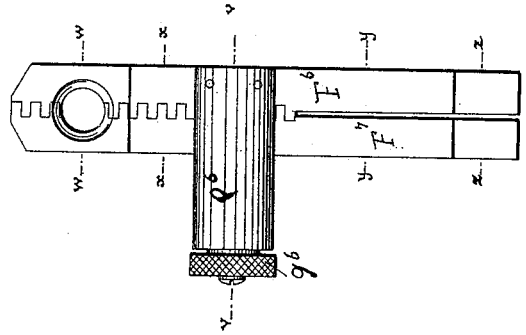
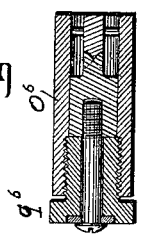
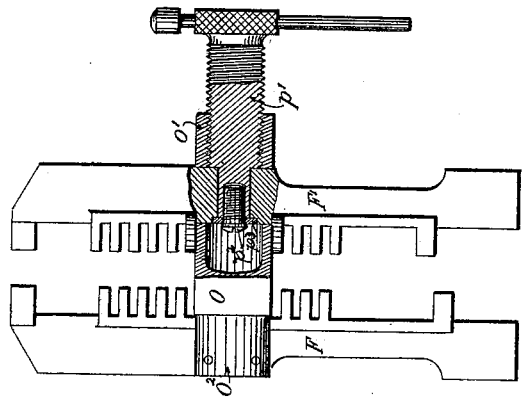
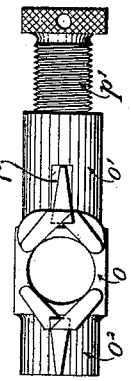
WITNESSES:
Henry V. Brown
Bernard J. Iseck
INVENTOR
Mary C. Dutton
Executrix of the last Will & Testament of Rufus Dutton deceased
THE NORRIS PETERS CO., PHOTO-LITHO., WASHINGTON, D. C.

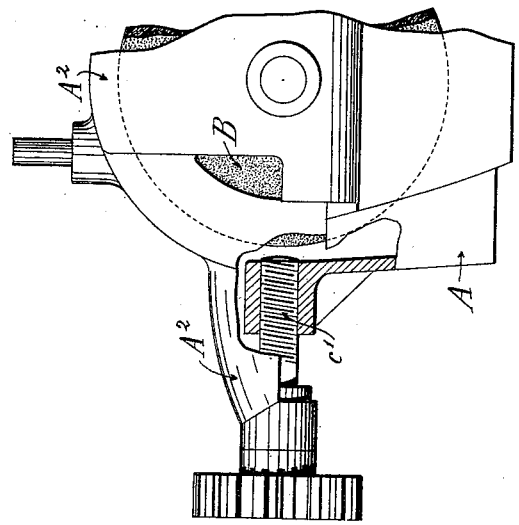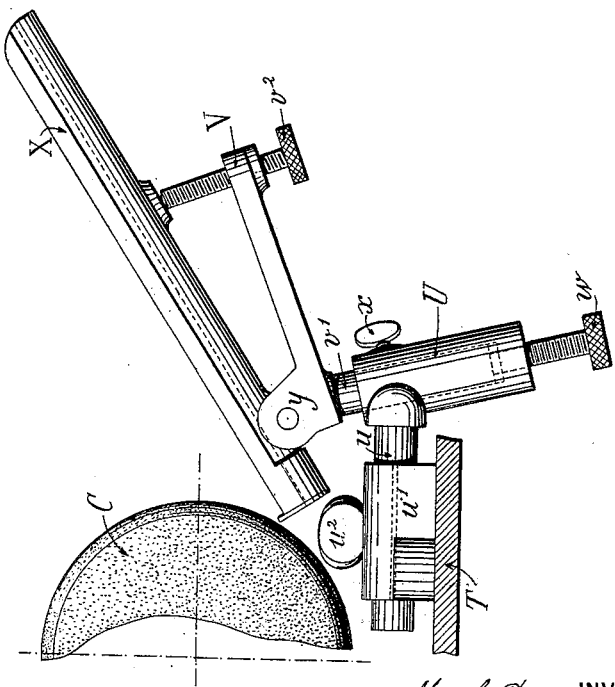

No. 622,212. Patented Apr. 4, 1899.
R. DUTTON, Dec'd.
M. C. DUTTON, Executrix.
TWIST DRILL GRINDER.
(Application filed Dec. 31, 1897.)
(No Model.) 6 Sheets—Sheet 6.
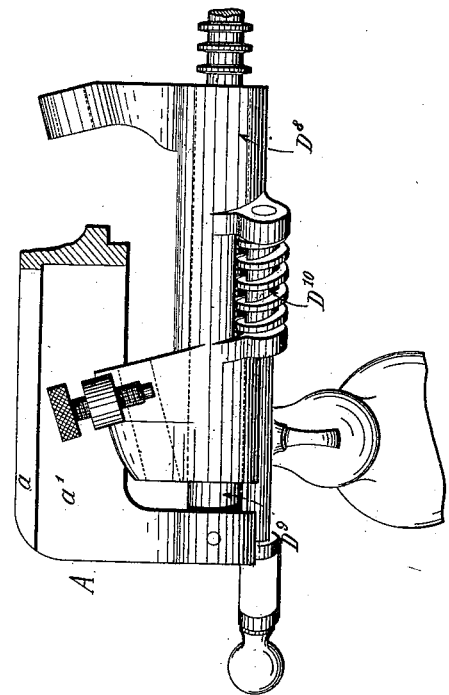
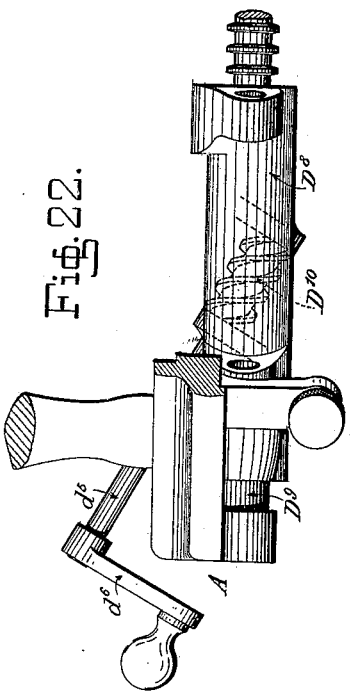
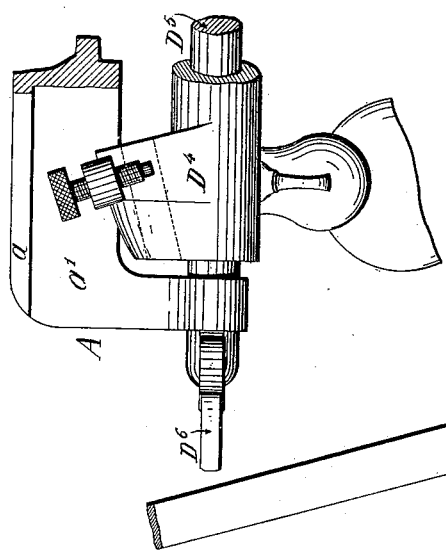
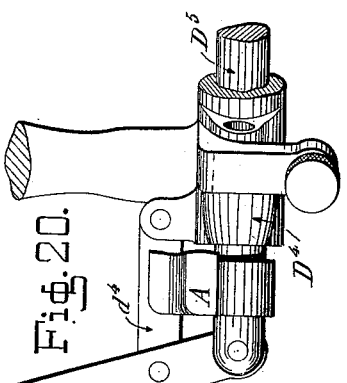
WITNESSES:
Henry V. Brown.
Bernard J. Isecke.
Mary C. Dutton INVENTOR
Executrix of the last Will & Testament of Rufus Dutton, deceased

UNITED STATES PATENT OFFICE.

MARY C. DUTTON, OF SING SING, NEW YORK, EXECUTRIX OF RUFUS DUTTON, DECEASED.

TWIST-DRILL GRINDER.

SPECIFICATION forming part of Letters Patent No. 622,212, dated April 4, 1899.

Application filed December 31, 1897. Serial No. 665,067. (No model.)

*To all whom it may concern:*

Be it known that I, MARY C. DUTTON, a citizen of the United States, and a resident of Sing Sing, in the county of Westchester, State of New York, having been heretofore duly appointed executrix of the last will and testament of RUFUS DUTTON, late a citizen of the United States, and resident of Sing Sing aforesaid, (as by the letters testamentary appointing me such executrix or a certified copy thereof will fully appear,) do hereby make application for Letters Patent for the Improvement in Twist-Drill Grinders invented by the said RUFUS DUTTON, which said invention is fully set forth and described in the following specification.

This invention relates to improvements in machines for grinding twist-drills.

It is particularly the object of the invention to furnish a machine so constructed and arranged that the grinding shall be done on the "face"—that is, the periphery—of the stone and not on the side, as is the present practice in twist-drill grinders. When drills are ground on the side, the stone is worn into grooves in places and soon worn out; but in grinding on the face the whole width of the face is ground on evenly and practically the whole mass of the stone is available, whereby the life of the stone is greatly prolonged.

It is another important object of the invention that the grinding shall be done on a wet stone and not on a dry one, as is the present practice, better work being done on the wet stone and danger of drawing the temper being averted.

It is also the purpose of the invention to provide means for regulating the grinding of the "clearance," so that this shall be determined by the machine and not left to the caprice of the workman.

Finally it is the purpose of the invention to provide such a construction and arrangement of parts as shall be compact, effective, and easily and quickly operated.

Referring to the drawings which accompany the specification, Figure 1 is a general perspective view of the machine with the lower part of the frame broken away. Fig. 2 is a perspective, on very large scale, of the cam on the chuck-holder which determines the grinding of the clearance. Fig. 3 is a cross-section, on large scale, of the preferred form of the chuck. Fig. 4 is a front and Fig. 5 an end elevation, on large scale, of the hand-lever and the sleeve of the chuck of the chuck-holder; and Fig. 6 is a top view of the same. Fig. 7 is a front and Fig. 8 an edge view of the adjustable block on which the said cam bears. Fig. 9 is a plan, partly sectioned, of the preferred form of chuck; and Fig. 10 is an end elevation of the same. Fig. 11 is a plan of a chuck for smaller drills, and Fig. 12 a cross-section of the same on the line $v\ v$ of Fig. 11. Figs. 13, 14, 15, and 16 are respectively cross-sections on the lines $w\ w$, $x\ x$, $y\ y$, and $z\ z$ of Fig. 11. Fig. 17 is an end elevation, partly broken, of the stone for thinning the points of the drills and the means for adjusting the drills. Fig. 18 is an elevation, partly broken, of the arrangement for moving up the stones as they wear. Fig. 19 is a front elevation, partly broken, of a lever and connections for reciprocating the chuck-holder, chuck, and drill; and Fig. 20 is a top view of the same. Fig. 21 is a front elevation, partly broken, of a rack and worm for reciprocating the chuck-holder, chuck, and drill; and Fig. 22 is a top view of the same.

The main parts of the machine include the frame A A', which is usually provided with a base-plate to be bolted to a floor, said base-plate not, however, being shown in the drawings; the stone B for sharpening the drills and the stone C for thinning the point; the water-reservoir B'; the chuck-holder sleeve D and chuck-holder proper, E, and the chuck F F'.

The overhanging flange $a$, as well as the surface $a'$ of frame A, is alined accurately parallel with the grinding-face of stone B and serves as a gage for adjusting said stone B. Said stones B C are fixed on the shaft $c$, which is supported in boxes carried in a sliding frame $A^2$, $c'$ being a screw for moving frame $A^2$ forward and back, so as to provide for bringing the face of the stone in line with flange $a$ when the stone wears, $b$ being a driven pulley fixed on said shaft. Said stone C has a rounded periphery and is sufficiently thin to permit it to grind in the grooves of the drill, so as to thin the point when desired.

The chuck-holder comprises as main parts the sleeve D and holder proper, E. Said sleeve D oscillates and slides on the fixed shaft D', supported in brackets of the frame. A weighted backwardly-extending arm $D^2$ serves as handle and counterweight. Through a hole in said arm $D^2$ works a bent rod $f$, the upper end $g$ of which is adapted to bear on the surface $a'$, $f'$ being a set-screw to fasten rod $f$ in any position.

Holder proper, E, is pivoted in ears $h\ h'$, carried by the sleeve D, said ears being so positioned that the axis of rotation of said holder E inclines upwardly, as shown. Adjacent to the pintle $i$ said holder is equipped with a cam $j$, whose cross-section increases toward the stone B—that is, toward the right in Fig. 1. (See Fig. 2.) A set-screw $k$ in a piece $k'$, carried by sleeve D, limits the upward motion of holder E. The plate of said holder E, preferably skeletonized and shaped as shown, is provided on its front edge with V-jaws $l\ l$, adapted to receive the chuck and positioned so as to bring the drill at the desired acute angle on the face of stone B, $l'$ being a stop to determine the original position of the chuck, $m$ a screw to move the chuck forward for adjustment of the drill on the stone, and $m'$ a set-screw to lock screw $m$.

Any suitable chuck may be used; but the preferred form for larger drills is shown in Figs. 3, 9, and 10 and for smaller drills in Figs. 11 and 12. Referring to Figs. 3, 9, and 10, the jaws F F' of said chuck are provided with V-teeth, those of the one jaw interlocking with those of the other jaw. Jaw F is fixed in the hub $o^2$ of a block $o$, which is centrally perforated with a hole of larger diameter than the diameter of the largest drill the chuck is to take, $o'$ being an internally-threaded and laterally-projecting hub on the outside of block $o$. Said hub $o'$ and the adjacent side of block $o$ are perforated with a through-and-through slot $p$, in which works the jaw F'. A screw $p'$, threading in hub $o$, is provided with an unthreaded rod, which passes through the hole in the hub of jaw F', being held in said hub by the screw and washer $p^2\ p^3$, Fig. 9. Jaw F' and screw $p'$ are assembled in place before jaw F is fixed in hub $o^2$.

Through depending lugs $e^2$ of holder E works a T-headed rod $q$, Fig. 3, on the threaded end of which is a thumb-nut $q'$. One or the other end of the head $q^2$ is caught under the edge of one of the jaws F F', and by tightening nut $q'$ the chuck is fixed in the V-jaws $l\ l$ of holder E. A pin fixed in lug $e^2$ adjacent to rod $q$, as indicated by dotted lines in Fig. 3, limits the motion of head $q^2$, so that the head takes a vertical position to grasp the chuck when nut $q'$ is turned home and a horizontal position to release the chuck when said nut is slacked off, and a spring $q^3$ loosens rod $q$ as soon as nut $q'$ is slacked off.

For smaller sizes of drills a modified chuck (shown in Figs. 11 and 12) is used. In the hub $o^6$ of jaw $F^6$ works jaw $F^7$, $q^6$ being a nut to close or open jaw $F^7$.

Water from vessel B' falls into a trough $s$ and thence upon stone B. From the stone it drips into tray T, which is formed or carried on the frame, and goes by opening $t$ to a vessel Z', which is supported on a bracket carried by the frame.

Adjacent to stone C is a sleeve U, carried on a pin $u$, which is swiveled in a bearing $u'$, carried on the frame. A rod $v'$, swiveled in sleeve U, carries a frame V, in ears $y$ of which is hinged a trough X, adapted to support the drill while stone C is grinding in the grooves to thin the point. A screw $w$ affects the original adjustment of the height of rod $v'$ and trough X, and screw $x$ locks rod $v'$ at the desired position. Screw $v^2$ then adjusts trough X at the proper inclination to bring the point of the drill against the stone. Screw $u^2$ locks pin $u$ in its bearing. Vessel B' is on a swiveled plate, so as to be swung over nozzle $z$ to wet stone C, the drip going to the aforesaid tray T.

In use the operator first fixes the drill in the chuck, then fastens the chuck in holder E by means of rod $q$ and nut $q'$, as described, and then adjusts piece $g$ by aid of the scale marked on edge of holder E, as shown. As there represented, the scale indicates the position of said piece $g$ for drills of from one-eighth to an inch in diameter, the inch-mark not being indicated, as that is the extreme right-hand position. Then he locks piece $g$ by screw $f'$, adjusts the chuck by screw $m$, and, taking handle $D^2$ in his left hand and holder E in his right hand, moves the drill back and forth across the face of the stone B, occasionally raising the handle and depressing the holder to grind the clearance, which is determined by the cam of the holder and the piece $g$. When one edge of the drill is ground, he takes the chuck out of the holder and reverses it, now fastening the other jaw in the holder, screw $m$ determining the position. He now grinds as before until the cam is hard against piece $g$ and that against the surface $a'$, when he can grind no more, and both cutting edges will be even. Now he removes the chuck, takes out the drill, places it in trough X, and grinds in the grooves to thin the point.

Referring to Figs. 19 and 20, a lever $D^6$ is pivoted on the end of fixed rod $D^5$ and is connected by link $d^4$ with the sleeve $D^4$ of the chuck-holder, which is of the same construction as shown in Fig. 1. By moving lever $D^6$ the operator reciprocates the said sleeve $D^4$ with the chuck-holder and moves the drill across the face of the stone.

Referring to Figs. 20 and 21, rack-teeth are formed, as shown, on the fixed rod $D^9$, and with these meshes a worm $D^{10}$, the shaft $d^5$ of which is carried in bearings fixed to the sleeve $D^8$ of the chuck-holder, which again is the same as that shown in Fig. 1. By turning the handle $d^6$ of said shaft $d^5$ the operator reciprocates the sleeve $D^8$ and moves the drill across the face of the stone.

Evidently other modifications of the means for reciprocating the drill can be used without departing from the essence of the invention, which consists in this respect of such construction and arrangement of parts that the drill is moved to and fro across the face of the stone.

Now, having described the improvements, I claim as the invention—

1. The combination in a twist-drill grinder, of a rotatable stone, a chuck-holder adapted to reciprocate across the peripheral face of the stone, a chuck adapted to be held in the chuck-holder and present the cutting edge of the drill against said face of the stone, and means for varying the grinding of the clearance according to the size of the drill, substantially as described.

2. The combination in a twist-drill grinder, of a rotatable stone, a chuck-holder adapted to reciprocate across the peripheral face of the stone, a chuck adapted to be secured in said chuck-holder and present the cutting edge of the drill against the face of the stone, a conoidal cam on the chuck-holder, and a movable part adapted to engage with said cam at various points to regulate the grinding of the clearance, substantially as described.

3. The combination in a twist-drill grinder, of a chuck-holder adapted to oscillate vertically and to reciprocate across the face of the stone, a conoidal cam on said chuck-holder, a chuck, a T-headed lock-bolt to fasten the chuck in the holder, a stop on the chuck-holder to limit the axial motion of the bolt, and a spring to loosen the bolt, substantially as described.

4. The combination in a twist-drill grinder of a chuck-holder, a chuck, a screw $m$ to lock the chuck in the holder, a screw to adjust the position of the chuck in the holder, and a screw $m'$ to lock the chuck or screw after adjustment.

5. The combination in a twist-drill grinder, of a stone, a sliding rotatable chuck-holder, a conoidal cam on said chuck-holder and a chuck adapted to slide the cutting edges and rock same on the face of the stone, substantially as and for the purpose described.

6. The combination in a twist-drill grinder, of a chuck-holder comprising a sliding rotatable sleeve and a holder proper hinged on the sleeve, a chuck, and means for locking the chuck in the holder, substantially as described.

7. The combination in a twist-drill grinder, of a chuck-holder comprising a sliding rotatable sleeve, a holder proper hinged on the sleeve, a clearance-cam on the holder proper, and an adjustable regulating-piece adapted to engage the cam, a chuck and means for locking the chuck in the holder, substantially as described.

8. The combination in a twist-drill grinder, of a stone, a rotatable sliding chuck-holder and chuck adapted to present the edge of a drill against and rock same on the face of the stone, and means for moving the stone laterally, substantially as described.

9. The combination in a twist-drill grinder of a gage-surface $a$, a stone, movable bearings for the stone, and means for moving the bearings whereby the face of the stone is brought up to the gage-surface, substantially as described.

Signed at the city of New York this 30th day of December, 1897.

MARY C. DUTTON,
*Executrix of the last will and testament of Rufus Dutton, deceased.*

In presence of—
BERNARD J. ISECKE,
HENRY V. BROWN.